Patented Apr. 27, 1943

2,317,486

UNITED STATES PATENT OFFICE 2,317,486

PRODUCTION OF ARTIFICIAL STRAW

George Schneider, Montclair, N. J., assignor to Celanese Corporation of America, a corporation of Delaware No Drawing. Application August 10, 1939, Serial No. 289,393

10 Claims. (Cl. 18—54)

This invention relates to the production of synthetic materials having the general appearance, texture and adaptability of the nature of natural straws, basket weaving canes, and like materials, and more particularly the production of such synthetic materials from yarns, filaments or staple fibers made of or containing thermoplastic compositions of matter.

An object of my invention is to provide an improved process for manufacturing the straw-like materials by physically uniting in controlled degree, continuous filaments, filaments of staple length, or abraded yarns of organic derivatives of cellulose, or mixtures of such materials with non-thermoplastic materials.

Another object of my invention is the production of straw-like materials of round or flattened cross-section from slivers or rovings comprising continuous filaments or staple fibers made of or containing an organic derivative of cellulose and having a plasticizer incorporated therein, or a mixture of such filaments or staple fibers with filaments or staple fibers of regenerated cellulose, cotton, silk, wool, or other filaments or fibers which are substantially inert to the action of the plasticizer employed when subjected to the action of heat, pressure or both, i. e. such non-thermoplastic filaments or fibers will not in themselves adhere one to the other in the process of my invention by the action of the plasticizer, but will become a part of the whole product produced containing thermoplastic material and plasticizer.

A further object of my invention is the production of improved synthetic straw-like materials, which are tougher, more pliable, generally stronger and more amenable to the processes by which such materials are converted into articles of use, and provide articles of use which are more durable and will stand up to more rigorous conditions of every-day use than has heretofore been possible.

Other objects of my invention will appear from the following detailed description and claims.

By my invention, straw-like materials having an organic derivative of cellulose base, are produced with a wider and more varied application in textile and other industries employing natural and artificial straws. The products of my invention, in contrast to natural straws, may be of great continuous length; for example, many thousands of yards, thereby resulting in greater efficiency and much less waste than is in the case of conversion of natural straws. Moreover, such great continuous length increases the scope of the products in the trade, as will be readily appreciated by those versed in the art of production of useful articles from straw-like materials.

Products prepared according to the process of my invention are substantially more water resistant than natural straws or synthetic straws that have heretofore been produced, thus increasing the field of their usefulness. Because of their toughness and pliability, the products of my invention may be applied with great advantage to the manufacture of wicker furniture, automobile upholstery, mats and the like. As will be seen from the following description of my invention, the physical properties of the straw-like body may be varied very considerably in respect to solidity, flexibility and surface nature. In fact, semi-stiff ornamental ropes not heretofore produced may be prepared.

The products made according to my invention not only can be varied as to the degree of stiffness and appearance, but may be varied also according to size, i. e. bulk size and weight per unit length. Accordingly, products suitable for use in millinery and like industries may have a smaller bulk size and be stiffer than products to be employed in making ornamental ropes. On the other hand, soft, flexible straw-like bodies of fine size can be made for the millinery trades, according to the process of my invention. By varying certain conditions later specified in this description of my process, products of flattened or, alternatively, round cross-section may be obtained. Other modifications of my process result in single or multi-color effects.

The synthetic straw-like bodies of my invention may be formed from bands, slivers or rovings of continuous filaments, staple fibers or abraded filament yarns, made of or containing one or more thermoplastic derivatives of cellulose, by treating the sliver with a plasticizer or solution of a plasticizer in a volatile solvent therefor, passing the plasticized band, roving or sliver through nip or quetch rolls whose pressure is controllable and adjustable, and then drying this plasticized and pressed band of material at elevated temperatures, after which straw-like material is collected by suitable take-up means. A slight stretch or tension may be imposed on the sliver before nipping or after nipping or both to control the coalescence of the filaments or fibers and to improve physical strength of the product.

The bulk size or weight per unit length of the band, sliver or roving of filaments that may be converted into synthetic straw-like bodies, according to the process of my invention, may be varied considerably. For example, according to the method of expressing the weight per length of silk, the denier of the band, sliver or roving may be from 10 to 32,000, or more. Where, for example, the band of the yarns or filaments has a denier of 1,800 or more, there may be produced therefrom, synthetic straw-like bodies having a width of the order of 2 millimeters with a flattened cross-section. Semi-stiff or stiff rope-like materials with a frizzy surface may be produced according to the process of my invention from bands, slivers or rovings having, for example, a denier of 1,000 or more. The bulk size of the individual filaments employed in the various modifications of my invention, may vary very greatly, according to the effect desired, but usually have a denier of from 1.0 to 10.0. Greater or smaller filaments, however, may be employed.

While I prefer to employ in the process of my invention bands, rovings or slivers of filaments having no or substantially no twist therein, I have found it advantageous for some purposes to insert a slight or moderate twist in the band, roving or sliver of filaments prior to coalescence into a straw-like body. However, for preparing straw-like bodies of rounded cross-section, the twist may be inserted after the sliver, roving or band of filaments has been treated with a plasticizer and before drying off the solvent used for applying the plasticizer where such solvent is used.

The solvent for the plasticizer in the production of straw-like materials made according to the process of my invention may be varied in order to modify the properties of the resulting products. Where stiffer products are desired it is of advantage to employ a solvent or a mixture of solvents for the plasticizer. The solvents for the plasticizers should preferably have softening and penetrating powers for the thermoplastic materials forming the basis of the straw-like materials, while such solvents are present prior to their evaporation from the products formed. For example, ethyl or methyl alcohols, dichlorethylene, diethyl ketone, ethylene-dichloride are of advantage in securing such results where cellulose acetate is the basic material employed. The softening and penetrating properties of the solvent for the plasticizer may be restricted in its softening and penetrating power for the thermoplastic materials by adding thereto substances having little or no softening or penetrating qualities, such as, for example, gasoline, kerosene, benzene and the like. The inclusion of plasticizer solvents possessing softening and penetrating properties is also of advantage in securing fast and deep penetration of dyestuffs applied to the products during the process of their formation.

The amount of plasticizer incorporated in the sliver, roving or band of filaments depends upon the properties desired in the final product. While I may employ plasticizer in widely varying amounts, such as, for example, from 4% to 75% or more, based on the weight of all of the filaments processed, I have found that for the production of straw-like bodies, optimum results are obtained with from 25% to 30% based on the weight of the filaments. The influence of higher amounts of plasticizer is to produce more thoroughly coalesced products yet without reducing the tough, flexible properties of the resulting products.

While I prefer to associate the fibers or filaments into a band, roving or sliver prior to the application of the plasticizer thereto, the plasticizer may be applied to the filaments or fibers prior to their association into a band, roving, sliver or the like. For example, ends of thermoplastic yarn having, for example, a denier of 300 and an individual yarn twist of 0.5 turn per inch, may have the plasticizer applied to the individual filaments during an intermediate winding operation, an operation in which the ends are wound together to form a sliver of higher total denier, or during the spinning process, i. e. the process of formation of filaments from a viscous spinning solution. Furthermore, the plasticizer may be dissolved in the spinning solution together with the thermoplastic derivative of cellulose and filaments, or bands of filaments may be spun therefrom according to well known methods.

The application of the plasticizer may be carried out in any suitable way and the methods which may be adopted for such application may comprise, for example, applying plasticizer to the association of filaments with wicks, rollers, pads, sprays, or any other device suitable for applying the plasticizer or a solution thereof. I have found a convenient method of applying the plasticizer to the materials to consist in dipping or immersing the association of filaments in the form of a sliver, band or roving in or through a bath containing the plasticizer or a solution of the plasticizer in a volatile solvent therefor.

Where the plasticizer is applied to the individual filaments, staple fibers, or both, before their formation into a band, sliver or roving for forming the straw-like products, the sliver may be treated with a volatile solvent for the plasticizer prior to passing through the quetch or pressure rollers used for forming the band and the like into a straw-like body, then drying and winding up.

The sliver or like association of filaments is treated in the bath containing the plasticizer or solution thereof, and while in the plastic condition is passed through nip or quetch rollers, the pressure of which may be adjusted for the product desired. Where the rollers are 8 inches in diameter and 56 inches in length, I have found that I may obtain artificial straws of flattened cross-section by applying a total pressure of 2,000 pounds on the sliver, and products of round cross-section by applying a total pressure of 800 pounds. From the nip or quetch rollers the product is passed through a substantially closed chamber of sufficient length, and maintained at a temperature high enough to evaporate off the volatile solvent, leaving behind the plasticized straw-like body that is formed. With the drying length measured along the formed body of 95 to 100 inches, I have found that the product should be passed through the chamber at a rate of from 10 to 20 yards per minute, and the temperature of the atmosphere in the chamber should be from 70 to 130° C. Obviously the drying length and the temperature of the drying atmosphere in the chamber will vary with the nature and denier of the product formed.

Numerous valuable novelty effects may be produced, according to the process of my invention. For example, any non-thermoplastic yarns, filaments or fibers may be associated in the sliver, by parallel winding together with the thermoplastic filaments and the like, winding such association with twist or by carding and forming into slivers or rovings, blended filaments of thermoplastic and non-thermoplastic type. Bands, rovings or slivers thus formed are coalesced into straw-like bodies by application of a plasticizer for the thermoplastic filamentary material content, pressing through rolls and drying as heretofore specified. Thus, for example, a roving from the first roving frame employed in the cotton system of spinning may be formed principally of cellulose acetate, cellulose aceto-propionate or other thermoplastic derivatives of cellulose, but have blended therein fibers of reconstituted cellulose, which may be, for example, viscose or may have blended therein cotton, silk, wool, or fibers produced from casein or soya bean protein. Such inclusion of non-thermoplastic filaments adds to the flexibility and strength of the straw-like bodies derived, and may produce new and very useful effects in having embedded firmly in the product and protruding at the surface more or less fibers which retain substantially their normal textile appearance, feel, etc. Such blended products have very valuable cross-dyeing properties.

Very valuable and novel effects may be imparted to the articles produced according to the process of my invention by employing dyed filaments of different colors. For example, filaments of the thermoplastic derivatives of cellulose may be dyed several different colors and associated into a sliver of varied color effects prior to coalescing into straw, thereby producing the straw-like body of variegated color. Similarly non-thermoplastic filaments employed in the manufacture of the straw-like body may be dyed one or more colors in contrast to the color of the thermoplastic filaments employed. Moreover, where carded yarns or rovings are employed in the process of my invention, there may be included in such associations of filaments, pills, noiles, and like irregularities, which may be of similar or contrasting color to the basic portion of the product. Such pills, noiles and the like may be formed of the thermoplastic filaments or the non-thermoplastic filaments employed. A further modification of my process involves the use of filaments which vary in diameter along their length producing pleasing irregularities in the straw-like body formed.

The filaments employed for forming the sliver and subsequently the straw-like body, may contain effect and filling materials, usch as dyes, pigments and natural or synthetic organic or inorganic bodies. A convenient method of incorporating dyestuff in the filaments or fibers of the sliver is to add a suitable dyestuff to the plasticizer bath, as I find that the straw-like bodies so produced have firmly fixed therein the dyestuff so applied. Softening and penetrating agents for the material of the sliver may be employed, for example ethyl alcohol, in order to improve the penetration of the dyestuff into the sliver.

My invention is particularly applicable to the treatment of synthetic filaments or staple fibers having a basis of cellulose acetate or other cellulose derivatives produced by the dry or evaporative method or by the wet or coagulation method of spinning. Examples of other cellulose derivatives which may form the basis of the filaments or staple fibers are cellulose formate, cellulose propionate, cellulose butyrate, cellulose acetopropionate, cellulose aceto-butyrate, thiocarbamic and alkoxy alkacyl esters of cellulose, cellulose ethers such as methyl, ethyl and benzyl cellulose, and the condensation products of cellulose with glycols or other polyhydric alcohols. Similarly ester-ethers of cellulose such as, for example, acetates of cellulose hydroxy ethyl-ethers may be employed.

Plasticizers suitable for use with the filaments or staple fibers of cellulose acetate or for organic derivatives of cellulose are methyl methoxy ethyl phthalate, dimethoxy ethyl phthalate, diethyl phthalate, dibutyl phthalate, triacetin, tricresyl phosphate, triphenyl phosphate, ethyl orthotoluene sulphonamide, ethyl paratoluene sulphonamide, etc. Any suitable solvent may be used for making up a solution of plasticizer for application to the sliver, providing, however, that such solvents are not solvent for the thermoplastic derivatives employed. For example, I may use in my process such solvents for the plasticizer as ethyl alcohol, methyl alcohol, benzol, toluene, etc.

The following examples are given to illustrate my invention.

*Example I*

A sliver having a denier of 1,800 and made up of six strands of 300 denier ring-spun yarns of continuous filaments of cellulose acetate is dipped cold in a bath containing 500 parts by weight each of dimethoxy ethyl phthalate and ethyl alcohol and is then passed through cloth-padded quetch rollers under such pressure that the sliver retains about 30%, based on the weight of the cellulose acetate present, of dimethoxy ethyl phthalate. The plasticized sliver is then led from the quetch rollers through a drying chamber maintained at a temperature of 125° C. The passage through the plasticizing bath, quetch rollers and drying chamber is continuous and is effected at a rate of about 20 yards per minute.

The product formed from the sliver is a fine straw of flattened cross-section 2 millimeters in width with smooth and sharp edges and has the appearance and feel of natural straw. The product is pliable, does not split easily, its knotting strength is very good and is very satisfactory for weaving purposes.

*Example II*

A sliver having a denier of 4,200 and made from ring-spun continuous filaments of cellulose acetate and having a twist of 1½ turns per inch is dipped cold in a bath containing 500 parts by weight each of dimethoxy ethyl phthalate and ethyl alcohol and is passed through cloth-padded quetch rollers under such pressure that the sliver retains about 35%, based on the weight of the cellulose acetate present, of dimethoxy ethyl phthalate. The plasticized sliver is led from the quetch rollers to a drying chamber maintained at 125° C. The passage through the plasticizing bath, quetch rollers and drying chamber is continuous and is effected at a rate of about 10 yards per minute.

The product formed from the sliver is a thin straw of fairly round cross-section, has good flexibility, knotting strength and coalescence. The product is suitable for use in the millinery trade.

*Example III*

A sliver formed by carding cellulose acetate staple fibers and having a denier of 10,250 and a twist of 0.75 turn per inch is dipped cold in a bath containing 800 parts by weight of dimethoxy ethyl phthalate and 200 parts by weight of ethyl alcohol and is then passed through cloth-padded quetch rollers under such pressure that the sliver contains 50%, based on the weight of the cellulose acetate present, of dimethoxy ethyl phthalate. The plasticized sliver is led from the quetch rollers through a drying chamber maintained at a temperature of 80 to 90° C. The passage through the plasticizing bath, quetch rollers and drying chamber is effected at a rate of about 10 yards per minute.

The product formed from the sliver is round and has a wooly appearance, has good coalescence and is suitable for use in making ornamental rope.

Example IV

A sliver is formed by carding a mixture of fibers containing 80% by weight of cellulose acetate fibers and 20% by weight of cotton staple, the sliver having a denier of 10,250 and having a twist therein of 0.75 turn per inch. This sliver is dipped cold in a bath containing 500 parts by weight each of dimethoxy ethyl phthalate and ethyl alcohol and is then passed through cloth-padded quetch rollers under such pressure that the sliver retains about 50%, based on the weight of the cellulose acetate present, of dimethoxy ethyl phthalate. The plasticized sliver is led from the quetch rollers through a drying chamber maintained at a temperature between 80 and 90° C. Passage through the plasticizing bath, quetch rollers and drying chamber is effected at a rate of about 10 yards per minute.

The product formed is straw-like, has a wooly feel, has good coalescence and is stronger than the product formed from all cellulose acetate staple fibers. The artificial straw is semi-stiff and may be readily braided.

Example V

A sliver formed by carding cellulose acetate staple fibers and having a denier of 10,250 is given a twist of one turn per inch while cotton threads are twisted into the sliver. The sliver is dipped cold in a bath containing 500 parts by weight each of dimethoxy ethyl phthalate and ethyl alcohol and is then passed through cloth-padded quetch rollers under such pressure that the sliver retains about 50%, based on the weight of the cellulose acetate present, of dimethoxy ethyl phthalate. The plasticized sliver is led from the quetch rollers through a drying chamber maintained at a temperature of 125° C. The passage through the plasticizing bath, quetch rollers and drying chamber is effected at a rate of about 10 yards per minute.

The product formed from the sliver is round, has a wooly appearance, and has good stiffness and flexibility and may be used for various ornamental purposes.

Example VI

A sliver having a denier of 10,250 formed from continuous filaments each having a denier of 2 is dipped cold in a bath containing 520 parts by weight of dimethoxy ethyl phthalate, 40 parts by weight of triacetin and 44 parts by weight of ethyl alcohol and is then stretched slightly and passed through cloth-padded quetch rollers under such pressure that the sliver retains about 30%, based on the weight of the cellulose acetate present, of dimethoxy ethylphthalate. The plasticized sliver is then led through from the quetch rollers through a drying chamber maintained at a temperature of 80° C. The passage through the plasticizing bath, quetch rollers and drying chamber is continuous and is effected at a rate of about 10 yards per minute.

The product formed from the sliver is a straw of flattened cross-section but is slightly softer than the straw made where only dimethoxy ethyl phthalate is used as a plasticizer.

In the foregoing specification I have offered detailed description and examples merely for the purpose of illustrating the process of my invention. Obviously many variations may be made therein without departing from the spirit of my invention. For example, slivers, bands, or rovings of filaments may contain higher twists than I have specified in order to modify the effect. Where such higher twists are inserted, usually greater plastification, higher pressure, or both, are required to produce the flat straw. Furthermore, the band or other association of filaments need not be coalesced to form a straw-like body continuously throughout its length, as application of the plasticizer and pressure from the nip or quetch rollers may be applied intermittently along the length of the sliver or association of filaments, so that alternately along the length of the product straw and association of filaments result. Furthermore, application of dyestuffs through the medium of the plasticizer may be intermittent and the color of the straw-like body may be caused to change along its length. Similarly, the sliver or association of filaments may be printed with novelty color effects along its length, prior to coalescence into a straw-like body. Moreover, the pressure rolls forming the straw-like body may be of any desired shape or surface contour, so that crinkled, crimped or other novelty effects may be imparted to the straw-like body formed. Similarly, a second pair of nip rolls of irregular but co-operating surfaces may be employed to impart crimps or other distortions after passage of the filaments through the first nip rolls and prior to the drying of the formed product. The products in the process of my invention lend themselves readily to crimping or otherwise distorting with embossing, crimping, or like rolls.

Having described my invention, what I desire to secure by Letters Patent is:

1. In a process for the manufacture of artificial straw-like materials, the steps of impregnating a sliver containing thermoplastic derivative of cellulose staple fibers with a solution of plasticizer in a volatile solvent therefor which is a non-solvent for the thermoplastic derivative of cellulose, applying pressure to said plasticized sliver while in a plastic condition, and drying the resulting product at a temperature of from 70 to 130° C., whereby there is obtained an artificial straw-like product of increased water-resistance, toughness and pliability.

2. In a process for the manufacture of artificial straw-like materials, the steps of impregnating a sliver containing cellulose acetate staple fibers with a solution of plasticizer in a volatile solvent therefor which is a non-solvent for the cellulose acetate, applying pressure to said plasticized sliver while in a plastic condition, and drying the resulting product at a temperature of from 70 to 130° C., whereby there is obtained an artificial straw-like product of increased water-resistance, toughness and pliability.

3. In a process for the manufacture of artificial straw-like materials, the steps of treating a sliver containing thermoplastic derivative of cellulose staple fibers in a plasticizing bath containing a solution of dimethoxy ethyl phthalate in ethyl alcohol, applying pressure to said plasticized sliver while in a plastic condition, and drying the resulting product at a temperature of from 70 to 130° C., whereby there is obtained an artificial straw-like product of increased water-resistance, toughness and pliability.

4. In a process for the manufacture of artificial straw-like materials, the steps of treating a sliver containing cellulose acetate staple fibers in a plasticizing bath containing a solution of dimethoxy ethyl phthalate in ethyl alcohol, applying pressure to said plasticized sliver while in a plastic condition, and drying the resulting product at a temperature of from 70 to 130° C., whereby there is obtained an artificial straw-like product of increased water-resistance, toughness and pliability.

5. In a process for the manufacture of artificial straw-like materials, the steps of impregnating a sliver containing thermoplastic derivative of cellulose staple fibers with a solution of plasticizer in a volatile solvent therefor which is a non-solvent for the thermoplastic derivative of cellulose, applying pressure to said plasticized sliver while in a plastic condition whereby the sliver retains an amount of plasticizer equal to 25 to 30%, based on the weight of the thermoplastic derivative of cellulose present, and drying the resulting product at a temperature of from 70 to 130° C., whereby there is obtained an artificial straw-like product of increased water-resistance, toughness and pliability.

6. In a process for the manufacture of artificial straw-like materials, the steps of impregnating a sliver containing cellulose acetate staple fibers with a solution of plasticizer in a volatile solvent therefor which is a non-solvent for the cellulose acetate, applying pressure to said plasticized solvent while in a plastic condition whereby the sliver retains an amount of plasticizer equal to 25 to 30%, based on the weight of the cellulose acetate present, and drying the resulting product at a temperature of from 70 to 130° C., whereby there is obtained an artificial straw-like product of increased water-resistance, toughness and pliability.

7. In a process for the manufacture of artificial straw-like materials, the steps of treating a sliver containing thermoplastic derivative of cellulose staple fibers in a plasticizing bath containing a solution of dimethoxy ethyl phthalate in ethyl alcohol, applying pressure to said sliver while in a plastic condition whereby the sliver retains an amount of plasticizer equal to 25 to 30%, based on the weight of the thermoplastic derivative of cellulose present, and drying the resulting product at a temperature of from 70 to 130° C., whereby there is obtained an artificial straw-like product of increased water-resistance, toughness and pliability.

8. In a process for the manufacture of artificial straw-like materials, the steps of treating a sliver containing cellulose acetate staple fibers in a plasticizing bath containing a solution of dimethoxy ethyl phthalate and ethyl alcohol, applying pressure to said plasticized sliver while in a plastic condition whereby the sliver retains an amount of plasticizer equal to 25 to 30%, based on the weight of the cellulose acetate present, and drying the resulting product at a temperature of from 70 to 130° C., whereby there is obtained an artificial straw-like product of increased water-resistance, toughness and pliability.

9. In a process for the manufacture of artificial straw-like materials, the steps of forming a sliver by carding thermoplastic derivative of cellulose staple fibers, impregnating said sliver with a solution of plasticizer in a volatile solvent therefor which is a non-solvent for the thermoplastic derivative of cellulose, applying pressure to said plasticized sliver while in a plastic condition, and drying the resulting product at a temperature of from 70 to 130° C., whereby there is obtained an artificial straw-like product of increased water-resistance, toughness and pliability.

10. In a process for the manufacture of artificial straw-like materials, the steps of forming a sliver by carding a mixture of thermoplastic and non-thermoplastic staple fibers, impregnating said sliver with a solution of plasticizer for the thermoplastic staple fibers in a volatile solvent for said plasticizer which is a non-solvent for the base of said thermoplastic staple fibers, applying pressure to said plasticized sliver while in a plastic condition, and drying the resulting product at a temperature of from 70 to 130° C., whereby there is obtained an artificial straw-like product of increased water-resistance, toughness and pliability.

GEORGE SCHNEIDER.